(12) United States Patent
Chung et al.

(10) Patent No.: US 8,446,988 B2
(45) Date of Patent: May 21, 2013

(54) SYSTEM AND METHOD FOR SELECTIVELY PERFORMING SINGLE-ENDED AND DIFFERENTIAL SIGNALING

(75) Inventors: Hoe-ju Chung, Yongin-si (KR); Jung-bae Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/280,456

(22) Filed: Oct. 25, 2011

(65) Prior Publication Data

US 2012/0039404 A1 Feb. 16, 2012

Related U.S. Application Data

(63) Continuation of application No. 12/103,823, filed on Apr. 16, 2008, now Pat. No. 8,050,332.

(30) Foreign Application Priority Data

May 3, 2007 (KR) ......................... 10-2007-0043024

(51) Int. Cl.
H04L 27/06 (2006.01)

(52) U.S. Cl.
USPC ......................................... 375/340; 375/354

(58) Field of Classification Search
USPC ................. 375/244, 254, 257, 289, 295, 258, 375/316, 324, 340, 344, 354, 368, 371; 710/6, 710/11, 14, 58, 72, 76
See application file for complete search history.

(56) References Cited

U.S. PATENT DOCUMENTS

| | | | |
|---|---|---|---|
| 5,978,419 A | 11/1999 | Cassiday et al. | |
| 6,198,688 B1 | 3/2001 | Choi | |
| 6,836,290 B1 | 12/2004 | Chung et al. | |
| 6,939,575 B2 | 9/2005 | Aonuma | |
| 7,113,559 B2 | 9/2006 | Baas et al. | |
| 7,159,160 B2 | 1/2007 | Yoh et al. | |
| 7,593,499 B1 | 9/2009 | Veenstra et al. | |
| 8,050,332 B2 * | 11/2011 | Chung et al. ................... | 375/244 |
| 2006/0171477 A1 | 8/2006 | Carballo et al. | |
| 2007/0061614 A1 | 3/2007 | Choi | |
| 2012/0128092 A1 * | 5/2012 | Lai et al. ....................... | 375/295 |

* cited by examiner

*Primary Examiner* — Dac Ha
(74) *Attorney, Agent, or Firm* — Volentine & Whitt, PLLC

(57) ABSTRACT

In a communication system, data is selectively transmitted using single-ended or differential signaling. The data is transmitted in relation to a plurality of clock signals having different relative phases. When the data is transmitted using single-ended signaling, data on adjacent signal lines undergo logic transitions at different times in relation to the plurality of clock signals.

4 Claims, 10 Drawing Sheets

(a)    (b)

SYSTEM AND METHOD FOR SELECTIVELY PERFORMING SINGLE-ENDED AND DIFFERENTIAL SIGNALING

CROSS-REFERENCE TO RELATED APPLICATIONS

This application is a continuation application of application Ser. No. 12/103,823, filed on Apr. 16, 2008, which is claims priority to Korean Patent Application No. 10-2007-0043024, filed on May 3, 2007, the disclosure of which is hereby incorporated by reference. The subject application is related to co-pending and commonly assigned U.S. patent application Ser. No. 11/451,802 filed Jun. 13, 2006, the subject matter of which is hereby incorporated by reference.

BACKGROUND OF THE INVENTION

1. Field of the Invention

Embodiments of the invention relate generally to circuits, devices, and methods adapted for use in systems performing digital signaling. More particularly, embodiments of the invention relate to circuits, devices, and systems capable of selectively performing single-ended and differential signaling, and methods associated with the circuits, devices, and systems.

2. Description of Related Art

Two commonly used methods for transmitting electrical signals via a communications channel (e.g., one or more electrical signal lines) are known as "single-ended signaling" and "differential signaling". In single-ended signaling, one signal line communicates a variable voltage representing transmitted data and another signal line is connected to a reference voltage, such as ground. In contrast, differential signaling uses two related signal lines to communicate complementary data signals which are combined at a receiver to form the transmitted data (i.e., a difference between the complementary data signal represents the transmitted data).

To detect a signal transmitted by single-ended signaling, a receiving device compares the varying voltage representing the signal with the reference voltage. On the other hand, to detect a signal transmitted by differential signaling, a receiving device compares the respective voltage levels of the complementary signals.

Single-ended signaling and differential signaling are used in a variety of popular communication protocols. For example, single-ended signaling is used in many parallel computer buses, PS/2 mouse and keyboard connectors, the RS-232 communication protocol, etc. Differential signaling is used, for example, in RS-422 and RS-485 communication protocols, PCI-X and USB communication protocols, etc.

Single-ended signaling and differential signaling have certain respective advantages and disadvantages. As a result, some applications prefer the use of single-ended signaling, while other applications prefer the use of differential signaling.

One significant advantage of single-ended signaling over differential signaling is that single-ended signaling generally requires fewer signal connection elements (e.g., signal lines, I/O pads, etc.) than differential signaling. For example, to simultaneously transmit "n" unique data signals, single-ended signaling requires "n" signal lines, plus one additional signal line to transmit the reference voltage. In contrast, to simultaneously transmit "n" unique data signals, differential signaling requires "2n" signal lines arranged in "n" pairs of complementary signal lines. Because single-ended signaling generally requires signal lines, the design and implementation of systems using single-ended signaling tends to be relatively simple and inexpensive, as compared with systems using differential signaling. In addition, because fewer signals are transmitted in single-ended signaling compared with differential signaling, single-ended signaling typically consumes less current than differential signaling.

One significant advantage of differential signaling over single-ended signaling is that differential signaling tends to be more tolerant of noise. The randomly occurring channel noise on constituent signal lines transmitting complementary signals may be cancelled out when the difference between the respective voltage levels of the complementary signals is detected at a receiving device. Additionally, differential signaling typically transmits each pair of complementary signals on a pair of balanced signal lines. As a result, electromagnetic interference tends to induce the same voltage offsets on both complementary signals. Further, receivers in differential signaling systems typically ignore wires' voltages with respect to a fixed reference while single-ended systems rely on the reference voltage. In some cases, the reference voltage of a single-ended system may have different offsets at the respective transmitter and receiver ends of the system due to different impedances between the reference wire and ground at the transmitter and receiver ends.

Some common forms of noise that may impair single-ended signaling systems more than differential signaling systems include crosstalk, simultaneous switching noise (SSN), and inter-symbol interference (ISI).

In general, the term "crosstalk" refers to interference between nearby signal lines due to conductive, inductive, or capacitative coupling. Similarly, the term "simultaneous switching noise" generally refers to undesired electrical effects caused by simultaneous switching of several nearby signal lines. For example, where several nearby signal lines switch from a low voltage level to a high voltage level, the voltage levels of some nearby signal lines may be undesirably raised from low levels to higher levels due to capacitative coupling, or the switching of some signal lines from the high voltage to the low voltage could be delayed due to the capacitative coupling. Alternatively, the simultaneous switching of several signal lines could also affect power and ground systems, temporarily altering their ability to drive the signal lines. Finally, the term "inter symbol interference" generally refers to interference between successive pulses or symbols in a sequentially transmitted signal stream. For example if a transition of a signal is slightly delayed, e.g., due to SSN, a subsequent signal may be detected with an erroneous value.

In view of the foregoing benefits and drawbacks of single-ended and differential signaling, circuit designers and system designers may use single-ended or differential signaling to transmit data in a particular communication channel based on the channel's operating characteristics. For example, to transmit or receive data in a high-speed data channel, differential signaling may be used in order to prevent errors related to noise. On the other hand, to transmit or receive data in a relatively lower speed data channel, or in a device requiring relatively low power consumption, single-ended signaling may be used in order to minimize development and operation costs.

SUMMARY OF THE INVENTION

Recognizing the relative benefits and drawbacks of single-ended and differential signaling, embodiments of the invention provide circuits, devices, systems, and methods capable of transmitting and/or receiving data by selectively using single-ended or differential signaling.

In one embodiment, the invention provides a device for use in a communication system, the device comprising; a multi-phase clock generator generating "n" (where n≧3) clock signals each having a different relative phase, and a transmitter receiving "m" (where m is a plural number) data bits in parallel and outputting the "m" data bits in series in relation to the "n" clock signals via a fixed number of output pads using either single-ended signaling or differential signaling based on an operating mode for the transmitter.

In another embodiment, the invention provides a system, comprising; a clock generator generating a system-level clock signal, a first device comprising a transmitter, and a second device comprising a receiver. The transmitter comprises; a first multi-phase clock generator receiving the system-level clock signal and generating "n" (where n≧3) first internal clock signals in relation to the system-level clock signal, wherein each one of the "n" first internal clock signals has a different relative phase, and a transmitter receiving "m" data bits in parallel and outputting the "m" data bits in series in relation to the "n" first internal clock signals via a fixed number of output pads using either single-ended signaling or differential signaling based on an operating mode for the transmitter. The receiver comprises; a second multi-phase clock generator receiving the system-level clock signal and generating "n" (where n≧3) second internal clock signals in relation to the system-level clock signal, wherein each one of the "n" first internal clock signals has a different relative phase, a single-ended signal receiver receiving and sampling at least one signal communicating the "m" data bits output by the transmitter using single-ended signaling and generating single-ended signal data, a differential signal receiver receiving and sampling differential signals communicating the "m" data bits output by the transmitter using differential signaling and generating differential signal data, and a selector receiving the differential signal data and the single-ended signal data and selectively outputting the differential signal data or the single-ended signal data based on an operating mode for the receiver.

In another embodiment, the invention provides a memory system, comprising; a memory controller transmitting a read command, and a memory module comprising a memory group responsive to the read command, wherein the memory group comprises a primary memory and a secondary memory. The primary memory receives input data from the memory controller associated with the read command using differential signaling and outputs primary internal data to the secondary memory using either differential signaling or single-ended signaling. The secondary memory outputs secondary internal data to the memory controller in response to the primary internal data received from the primary memory.

In another embodiment, the invention provides a method of transmitting data in a communication system, the method comprising; generating "n" clock signals (where n≧3), wherein each one of the "n" clock signals has a different relative phase, selectively transmitting "m" bits of data serially using either single-ended or differential signaling based on a logic state of a transmission mode signal and via a fixed number of output pads, wherein when the "m" data bits are transmitted using single-ended signaling, respective bits of the "m" data bits output on different ones of the output pads undergo respective data state transitions at different times, as defined by the phase of different ones of the "n" clock signals.

BRIEF DESCRIPTION OF THE DRAWINGS

Embodiments of the invention are described below with reference to the accompanying drawings. Throughout the drawings, like reference labels indicate like or similar features. In the drawings.

DESCRIPTION OF EMBODIMENTS

Selected embodiments of the invention are described hereafter with reference to the corresponding drawings. These embodiments are presented as teaching examples while the actual scope of the invention is defined by the claims that follow.

In general, embodiments of the invention relate to electronic circuits, devices, and systems capable of selectively transmitting and receiving data using single-ended signaling or differential signaling depending on the characteristics of a channel in which the data is being transmitted. In certain embodiments, a single set of signal lines is used to transmit and receive the data when selectively using single-ended signaling or differential signaling. Accordingly, a common single set of input/output (I/O) pins may be used regardless of the type of signaling used.

Various embodiments of the invention use multi-phase clocking techniques to facilitate the selective use of single-ended or differential signaling. In general, a multi-phase clocking technique uses multiple clocks or different clock phases to control the operation of a circuit, device, or system. For example, a two-phase clocking technique uses two clocks having a phase difference of 180 degrees relative to each other to trigger different operations of a circuit (i.e., turning ON/OFF certain components within the circuit). Similarly, a four-phase clocking technique may uses four clocks each having a relative phase difference of 90 degrees, and an eight-phase clocking technique uses eight clocks each having a relative phase difference of 45 degrees. Thus, the plurality of clock signals generated and used in a multi-phase clocking scheme are said to have "different relative phases", or phases the are different from one another.

Embodiments of the invention find ready application in a wide variety of electronic systems such as communication systems, logic circuits, memory systems, and so on. As one example, certain embodiments of the invention will find application in memory systems such as those disclosed, for example, in previously incorporated U.S. Patent Application Publication No. 2007/0061614. In this particular application, various memory devices and a memory controller within a memory system use either single-ended or differential signaling to communicate data. Within this type of application, selected embodiments of the invention may be used to implement a single transmitter/receiver combination capable of facilitating the single-ended or differential signaling.

Figure 1:
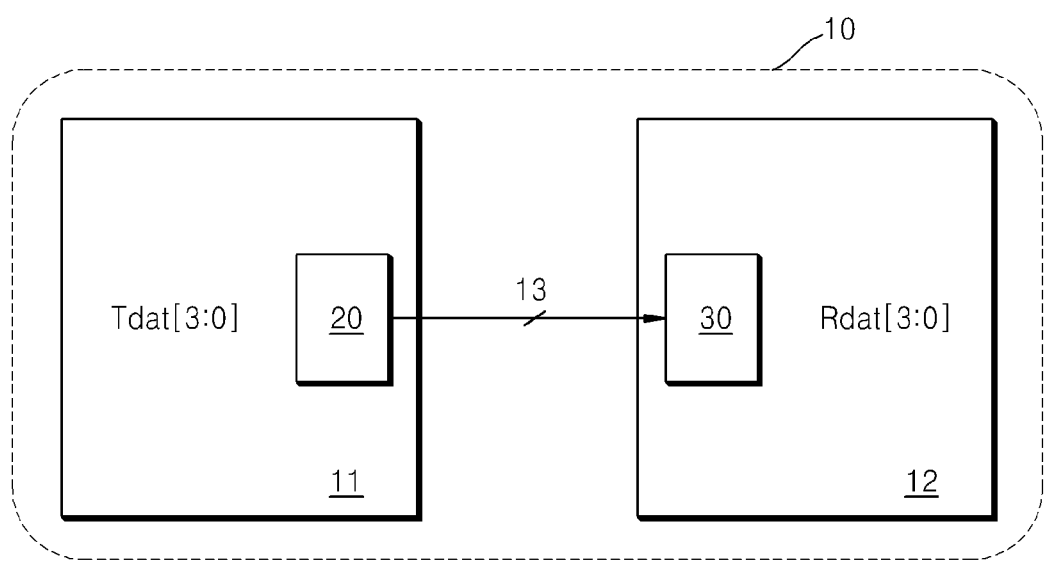
FIG. 1 is a conceptual block diagram illustrating a communication system in accordance with one embodiment of the invention.

FIG. (FIG.) 1 is a conceptual block diagram generally illustrating a communication system 10 in accordance with an embodiment of the invention. Referring to FIG. 1, communication system 10 comprises first and second devices 11 and 12. First device 11 comprises a transmitter 20 and second device 12 comprises a receiver 30. Transmitter 20 transmits data (Tdat[3:0]) to receiver 30 through a transmission channel 13 (e.g., a data bus) using either differential signaling or single-ended signaling.

For explanation purposes, it is assumed that first and second devices 11 and 12 of communication system 10 each comprises a memory controller or one or more memory device(s). For example, first and second devices 11 and 12 may be two related memory devices combined in a stacked memory architecture, or first and second devices 11 and 12 may be respectively a memory controller and a corresponding collection of one or more memory device(s). Despite the memory system context of the following technical description, those skilled in the art will recognize that first and second devices 11 and 12 may be any type of device beneficially capable of communicating data using either single-ended or differential signaling. Along these lines, the terms "transmitter" and "receiver" should not be given a limited interpretation. More accurately, the term "transmitter" reference to any unitary device or portion of a device, circuit or system capable of providing data to a communications channel. Similarly, the term "receiver" refers to any device or portion of device, circuit or system capable of detecting and discriminating data from the channel. Likewise, one or more hardwired signal lines are assumed as an exemplary channel in the description that follows. However, those skilled in the art will further recognize that other channel types (e.g., IR, RF, etc.) might be used.

In the example of FIG. 1, first device 11 supplies internal parallel data Tdat[0:3] to transmitter 20. Transmitter 20 then converts parallel data Tdat[0:3] into serial data to be transmitted via channel 13. Although various examples in this written description use only four (4) bits of parallel data, the actual number of data bits supplied by transmitter 20 in a given system is a matter of design choice and will be determined in most instances by the communications protocol being, the number of I/O pads available in transmitter 20 and/or receiver 30, a data pre-fetch capacity for transmitter 20, etc.

The term "pre-fetch capacity" refers to a number of separate units of data that will be independently transmitted via output pads associated with transmitter 20 during a defined period. Thus, the number of available output pads and the pre-fetch capacity of transmitter 20 will define the size of a data block communicated from transmitter 20 to receiver 30. For example, if transmitter 20 is assumed to be using single-ended signaling and is further assumed to have eight (8) available output pads and a pre-fetch capacity of eight, then 8*8 or 64 bits of parallel data may be transferred from transmitter 20 during a defined period. In contrast, where differential signaling is used, if four bits of parallel data are to be transferred by transmitter 20 during a defined period and transmitter 20 has two (2) available output pads, then transmitter 20 must have a pre-fetch capacity of four in order to separately transmit four pairs of complementary signals through the two output pads. Given the foregoing relationships between available I/O pads, signaling type, and pre-fetch capacity, a system designer may reasonably define any number of data block sizes and transfer periods according to various system constraints.

Figure 2:
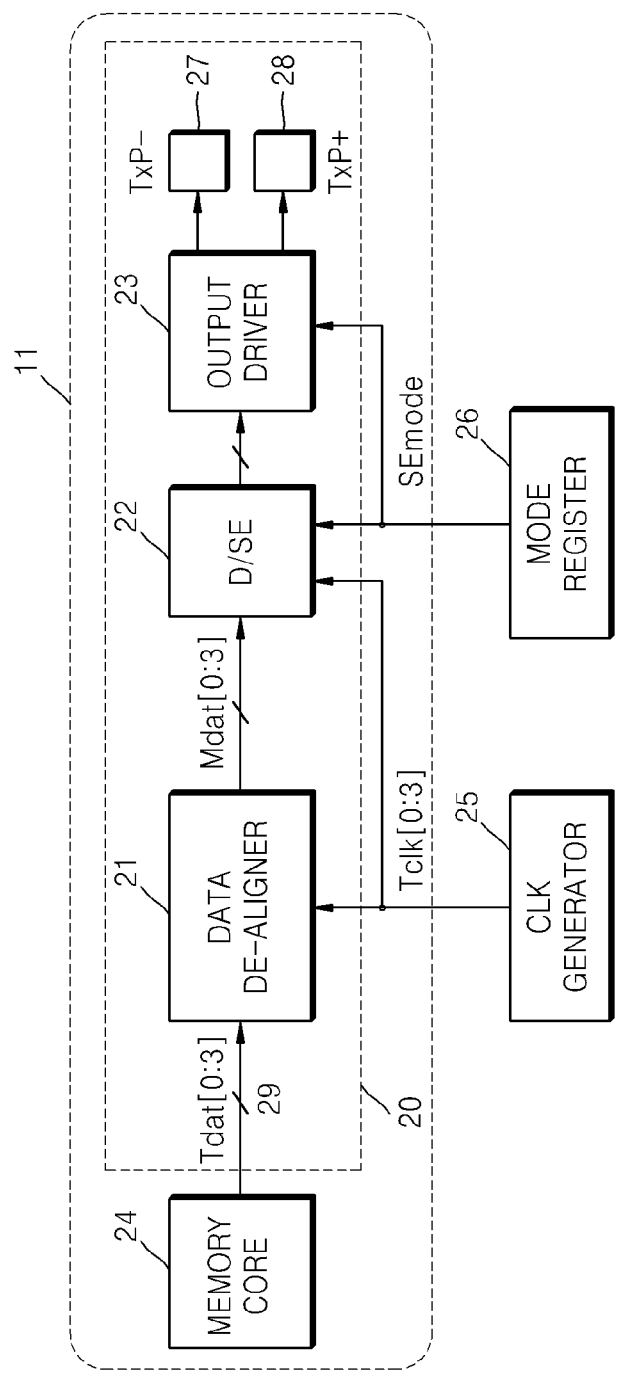
FIG. 2 is a block diagram illustrating various elements of a first device in the communication system of FIG. 1 in accordance with an embodiment of the invention.

FIG. 2 is a block diagram further illustrating various elements of first device 11 of FIG. 1 in accordance with an embodiment of the invention. Referring to FIG. 2, first device 11 comprises a memory core 24 connected to a transmitter 20 via an internal data bus 29. Memory core 24 comprises a memory cell array from which stored data is transmitted in parallel to transmitter 20 via internal data bus 29. In the example illustrated in FIG. 2, transmitter 20 is assumed to have two (2) available output pads and a data pre-fetch capacity of two for single-ended signaling or a data pre-fetch capacity of four for differential signaling.

Transmitter 20 comprises a data de-aligner 21, a differential/single-ended (D/SE) signal generator 22, an output driver 23, and output pads 27 and 28. Output pads 27 and 28 may be connected to respective data transmission lines 13b and 13a of channel 13.

Data de-aligner 21 receives parallel data Tdat[0:3] from memory core 24 and converts parallel data Tdat[0:3] into serial data Mdat[0:3]. The conversion of parallel data Tdat[0:3] into serial data Mdat[0:3] by data de-aligner may be conventionally controlled by four clock signals Tclk[0:3] generated by an associated clock signal generator 25. As is conventionally understood, clock signal generator 25 may be implemented using a phase locked loop (PLL) or a delay locked loop (DLL) circuit.

In the example of FIG. 2, it will be assumed that clock signals Tclk[0:3] have four different respective phases separated from each other by 90 degrees. In other embodiments, more data bits may be transmitted using a greater or lesser number of clock signals (e.g., eight respective clock signals separated from each other by 45 degrees). One or more bits of parallel data Tdat[0:3] provided by memory core 24 may be subsequently output by data de-aligner 21 as serial data Mdat[0:3] in synchronization with one or more of the applied clock signals Tclk[0:3].

D/SE signal generator 22 receives serial data Mdat[0:3] from data de-aligner 21 and outputs serial data Mdat[0:3] using differential signaling or single-ended signaling based on the state (i.e., a digital logic level) of a transmission mode signal SEmode. In the illustrated example of FIG. 2, transmission mode signal SEmode is provided by a mode register 26. Mode register 26 may be conventionally implemented using, for example, fuse cutting, bonding, or mode register setting techniques. In the illustrated example, transmission mode signal SEmode is assumed to have a logically "high" value indicating uses of single-ended signaling, and thus D/SE signal generator 22 provides the serial data consistent with a defined single-ended signaling protocol. In contrast, if transmission mode signal SEmode were "low" indicating a differential signaling mode, D/SE signal generator 22 would provide the serial data using a defined differential signaling protocol.

Output driver 23 receives the serial data from D/SE signal generator 22 and drives corresponding signals onto output pads 27 and 28. The particular dictates of various design parameters will define the amplitude, frequency and other characteristics of the output signals provided to output pads 27 and 28 by output driver 23. Where differential signaling is used, a pair of complementary signals (TxP−, TxP+) are driven onto output pads 27 and 28. On the other hand, where single-ended signaling is used, two different data signals are driven onto output pads 27 and 28. Because output pads 27 and 28 output a single pair of complementary signals when differential signaling is used, the example of FIG. 2 can be thought of as illustrating a single differential signaling output channel or two single-ended signaling output channels.

Figure 3:
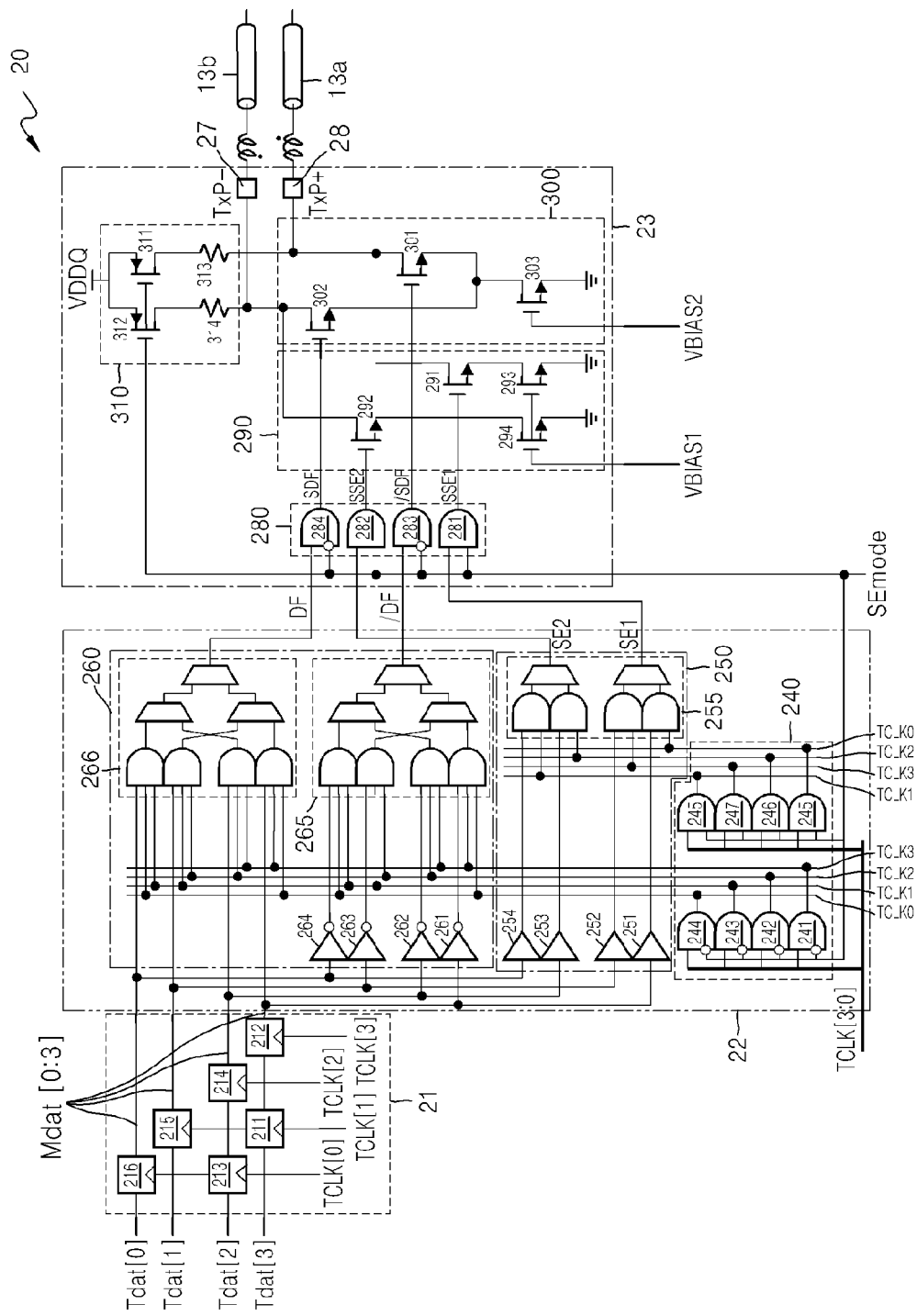
FIG. 3 is a circuit diagram illustrating a transmitting part within the first device of FIG. 2 in accordance with an embodiment of the invention.

FIG. 3 is a circuit diagram further illustrating transmitter 20 of FIG. 2.

Figure 4:
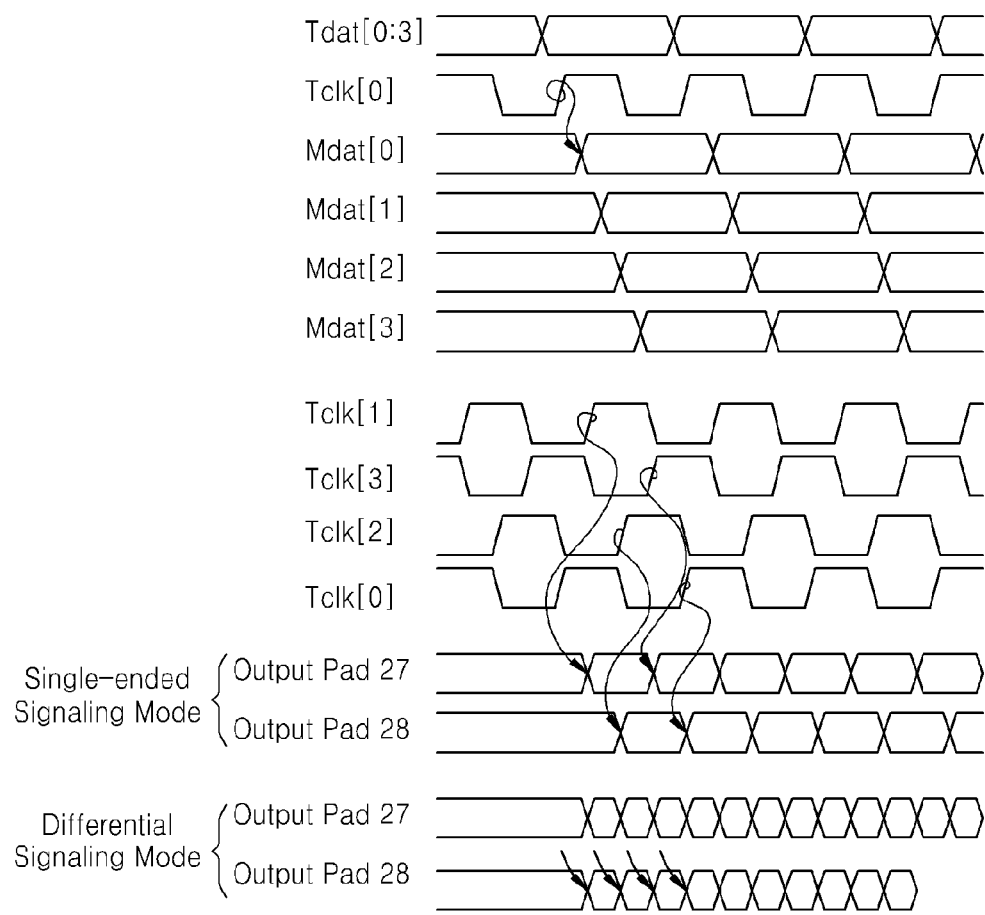
FIG. 4 is a waveform timing diagram illustrating the operation of the transmitting part illustrated in FIG. 3 during a single-ended signaling mode and during a differential signaling mode.

Referring to FIG. 3, data de-aligner 21 receives parallel data Tdat[0:3] and generates serial data Mdat[0:3] under the control of clock signals Tclk[0:3]. More particularly, data de-aligner 21 buffers parallel data Tdat[0:3] in respective rising-edge triggered flip-flops 211 through 216 as shown in FIG. 3 and outputs the parallel data Tdat[0:3] as serial data Mdat[0:3]. The timing diagram shown in FIG. 4 illustrates one exemplary timing relationship between parallel data Tdat [0:3] and serial data Mdat[0:3].

D/SE signal generator 22 receives serial data Mdat[0:3] and outputs serial data Mdat[0:3] using differential signaling or single-ended signaling based on the logic state (i.e., the digital data value) of transmission mode signal SEmode. In the illustrated example of FIG. 3, D/SE signal generator 22 comprises a differential signaling unit 260, a single-ended signaling unit 250, and a clock enabling unit 240 selectively providing clock signals Tclk[0:3] to differential signaling unit 260 or single-ended signaling unit 250.

Clock enabling unit 240 comprises a plurality of logic gates 241 through 248 collectively receiving and selectively outputting clock signals Tclk[0:3] as shown in FIG. 3 based on the logic state of transmission mode SEmode.

Single-ended signaling unit 250 comprises input buffers 251 through 254 receiving and buffering serial data Mdat[0:3], and a single-ended signaling multiplexer 255 outputting serial data Mdat[0:3] during single-ended signaling as single-ended output signals SE1 and SE2. Single-ended signaling unit 250 outputs Mdat[0:3] as single-ended output signals SE1 and SE2 under the control of clock signals Tclk[0:3]. In particular, when clock signal Tclk1 is "high", Mdat0 is output as single-ended output signal SE2. When clock signal Tclk2 is "high", Mdat1 is output as single-ended output signal SE1. When clock signal Tclk3 is "high", Mdat2 is output as single-ended output signal SE2, and when clock signal Tclk0 is "high", Mdat3 is output as single-ended output signal SE1.

Differential signaling unit 260 comprises inverters 261 through 264 which are used to invert serial data Mdat[0:3] and generate a pair of complementary signals. Differential signaling unit 260 also comprises first and second differential signaling multiplexers 265 and 266 outputting the pair of complementary signals during differential signaling as differential output signals DF and /DF. First and second differential signaling multiplexers 265 and 266 output differential output signals DF and /DF under the control of clock signals Tclk[0:3].

In particular, when clock signals Tclk0 and Tclk1 are "high", serial data Mdat0 is output as differential output signal DF. When clock signals Tclk1 and Tclk2 are "high", serial data Mdat1 is output as differential output signal DF. When clock signals Tclk2 and Tclk3 are "high", serial data Mdat2 is output as differential output signal DF, and when clock signals Tclk3 and Tclk0 are "high", serial data Mdat3 is output as differential output signal DF.

Similarly, when clock signals Tclk0 and Tclk1 are "high", inverted serial data /Mdat0 is output as inverted differential output signal /DF. When clock signals Tclk1 and Tclk2 are "high", inverted serial data /Mdat1 is output as inverted differential output signal /DF. When clock signals Tclk2 and Tclk3 are "high", inverted serial data /Mdat2 is output as inverted differential output signal /DF, and when clock signals Tclk3 and Tclk0 are "high", inverted serial data /Mdat3 is output as inverted differential output signal /DF.

In the illustrated example of FIG. 3, output buffer 23 comprises a D/SE selector 280, a single-ended signaling driver 290, a differential signaling driver 300, and a current source 310.

D/SE selector 280 receives transmission mode signal SEmode and outputs single-ended output signals SE1 and SE2 or differential output signals DF and /DF based on the logic state of transmission mode signal SEmode. Where transmission mode signal indicates the single-ended signaling mode, D/SE selector 280 outputs differential output signals DF and /DF as differential output signals SDF and /SDF to differential driver 300. On the other hand, where transmission mode signal SEmode indicates the differential signaling mode, D/SE selector 280 outputs single-ended output signals SE1 and SE2 as single-ended output signals SSE1 and SSE2 to SE driver 290. In the embodiment of FIG. 3, SE driver 290 and differential driver 300 each comprise an arrangement of transistors (e.g., arrangements 291-294 and 301-303, respectively), but those skilled in the art will recognize that many different component arrangements may be used to implement these circuits.

Differential driver 300 outputs differential output signals SDF and /SDF to respective output pads 27 and 28 during the differential signaling mode, and SE driver 290 outputs single-ended output signals SSE1 and SSE2 to respective output pads 28 and 27 during the single-ended signaling mode.

A first bias signal VBIAS1 is applied during the single-ended signaling mode to operate SE driver 290, and a second bias signal VBIAS2 is applied during the differential signaling mode to operate differential driver 300. During the single-ended signaling mode, SE driver 290 is driven by a current mirror circuit.

During the differential signaling mode, transmitter 20 outputs parallel data Tdat[0:3] as differential output signals SDF and /SDF through respective output pads 27 and 28 based on various logical combinations of clock signals Tclk[0:3] described above.

Similarly, during the single-ended mode, transmitter 20 outputs parallel data Tdata[0:3] as single-ended output signals SSE1 and SSE2 through respective output pads 28 and 27 based on clock signals Tclk[0:3]. More particularly, parallel data Tdat0 and Tdat2 is output as single-ended output signal SSE2 on output pad 27 in response to respective clock signals Tclk1 and Tclk3, and parallel data Tdat1 and Tdat3 is output as single-ended output signal SSE1 on output pad 28 in response to respective clock signals Tclk2 and Tclk0.

During the single-ended signaling mode, single-ended output signals SSE1 and SSE2 are output on respective transmission lines 13a and 13b in synchronization with various clock signals. As a result, simultaneous switching noise is prevented from introducing noise into these signals.

In either the single-ended or differential modes of operation, the foregoing data signals may be driven onto transmission lines 13a and 13b with the aid of current source 310 supplying with a reference voltage VDDQ through dual transistor resistor branches, 312/314 and 311/313.

FIG. 4 is a waveform timing diagram further illustrating the operation of transmitter 20 during both single-ended and differential signaling modes. As seen in FIG. 4, parallel data Tdat[0:3] is sampled to generate serial data Mdat[0:3] in synchronization with the respective rising edges of "n" clock signals Tclk0, Tclk1, Tclk2, and Tclk3, where "n" in this particular embodiment is four (4).

In FIG. 4, sections of serial data Mdat[0:3] that are delimited by dotted vertical lines represent periods in which serial data Mdat[0:3] is sampled as output data to be transmitted on output pads 27 and 28. These sections are arranged after a setup time for the respective serial data Mdat[0:3]. In the example of FIG. 4, the setup time for serial data Mdat[0:3] is equal to a phase difference between respective clock signals Mdat[0:3].

As further illustrated in FIG. 4, when transmitter 20 operates in single-ended signaling mode, serial data Mdat0 is output as single-ended output signal SSE2 on output pad 27 when clock signal Tclk1 is "activated" (i.e., transitions to a logically "high" state); serial data Mdat1 is output as single-ended output signal SSE1 on output pad 28 when clock signal Tclk2 is activated; serial data Mdat2 is output as single-ended output signal SSE2 on output pad 27 when clock signal Tclk3 is activated; and serial data Mdat3 is output as single-ended output signal SSE1 on output pad 28 when clock signal Tclk0 is activated.

On the other hand, when transmitter 20 operates in differential signaling mode, serial data Mdat0 is output as the complementary pair of differential output signals DF and /DF when clock signals Tclk0 and Tclk1 are both activated; serial data Mdat1 is output as the complementary pair of differential output signals DF and /DF when clock signals Tclk1 and Tclk2 are both activated; serial data Mdat2 is output as the complementary pair of differential output signals DF and /DF when clock signals Tclk2 and Tclk3 are both activated; and serial data Mdat3 is output as the complementary pair of differential output signals DF and /DF when clock signals Tclk3 and Tclk0 are both activated.

As an alternative to the exemplary timing schemes illustrated in relation to FIGS. 3 and 4, transmitter 20 may operate in a double data rate mode, thereby reducing the number of clock signals required to switch the constituent circuit components. As an example, to implement a double data rate mode of operation, timing signals Tclk[2] and Tclk[3] may be omitted, flip-flops 212 and 214 may be modified to also toggle their logic state on the falling edges of the respective clock signals Tclk[1] and Tclk[0], and inverted versions of clock signals Tclk[0] and Tclk[1] may then be substituted for clock signals Tclk[2] and Tclk[3], respectively, within D/SE signal generator 22. If a double data rate mode of operation is used, data signals for single-ended signaling are generated at a rate of two data signals per clock cycle of each of clock signals Tclk[0] and Tclk[1] and data signals for differential signaling are generated at a rate of four data signals per clock cycle. This type of double data rate operating mode may also be used with a receiver associated with transmitter 20.

Regardless of the particular clocking scheme used in various embodiments of the invention, the transmitter and receiver sides of the communication system may generate a plurality of "n" internal clock signals from a system-level or master clock. In this manner, the single-ended and/or differential signaling schemes facilitated by various embodiments of the invention may function in relation to (i.e., in synchronization with) one or more of the "n" internal clock signals.

Figure 5:
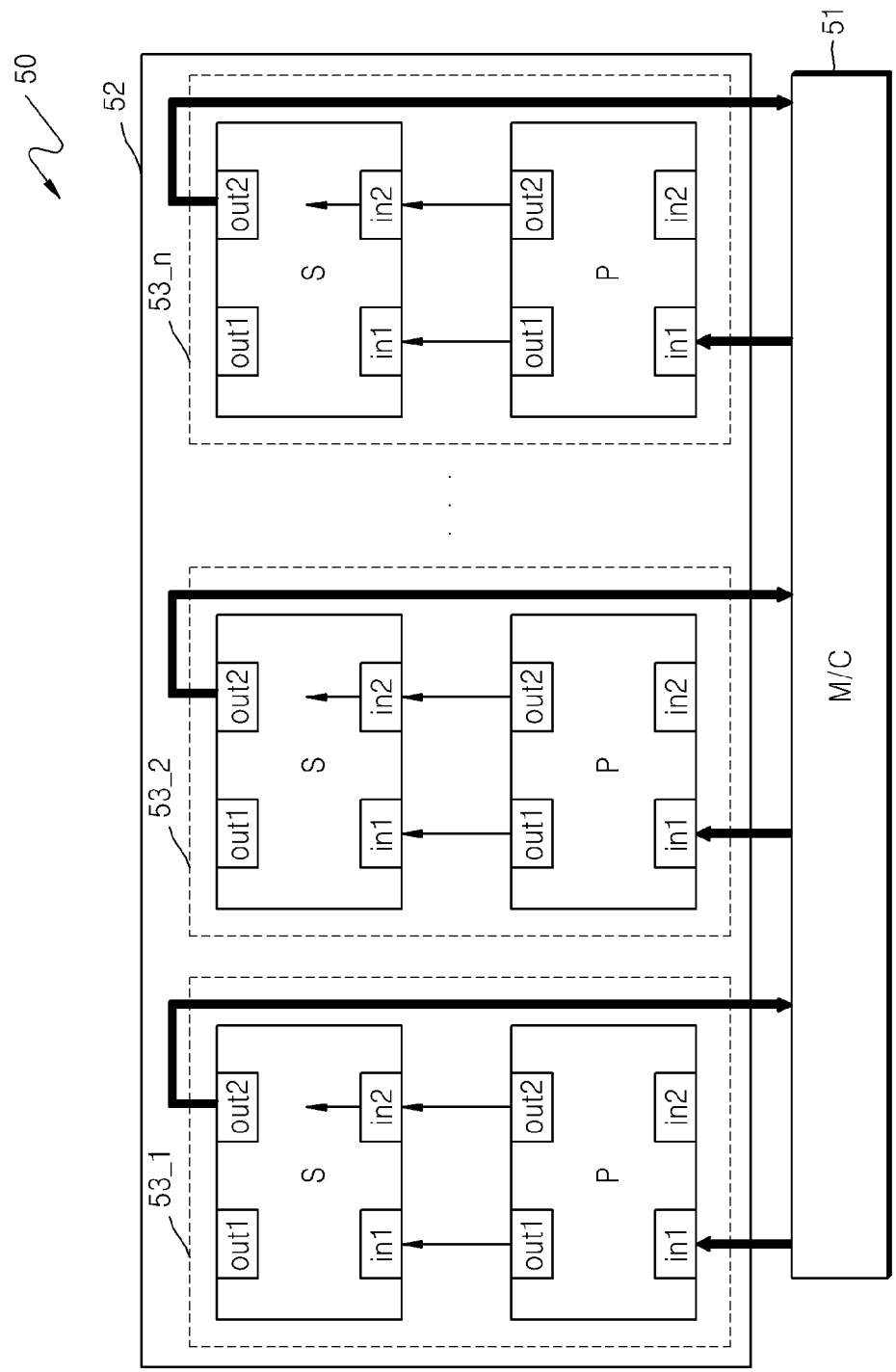
FIG. 5 is a block diagram illustrating a memory system using single-ended signaling and differential signaling in accordance with an embodiment of the invention.

FIG. 5 is a block diagram illustrating a memory system 50 in accordance with an embodiment of the invention. Referring to FIG. 5, memory system 50 comprises a memory controller 51 and a memory module 52 comprising a plurality of memory groups 53_1 through 53_n. Each of memory groups 53_1 through 53_n comprises at least a primary memory "P" and one or more secondary memory "S". In general, primary and secondary memories P and S will typically be of the same type (e.g., DRAM, SRAM, flash, etc) However, for purposes of the explanation that follows, primary and secondary memories P and S will be assumed to be DRAM type memory devices.

In the example of FIG. 5, each primary memory P receives command/address/write data (CAWD) from memory controller 51 using differential signaling. The primary memory may then "repeat" the CAWD data to a corresponding secondary memory S using single-ended signaling. Additionally, read data from a primary memory P may be transmitted to a corresponding secondary memory S using single-ended signaling. Each secondary memory S may transmit read data (or re-drive read data received from primary memory P) to memory controller 51 using differential signaling.

In other embodiments, wherein memory controller 51 is able to by-pass a primary memory P and directly communicate CAWD to a secondary S, differential signaling may be used. Thus, while differential signaling is often preferred between memory controller 51 and any one of the primary or secondary memories P ands due to a relatively large number of I/O pads available on memory controller 51, single-ended signaling is preferably used to facilitate data transfers between individual memories P or S (i.e., to facilitate inter-memory data transfers).

For example, to read data from any one of memory groups 53_1 through 53_n in one embodiment of the invention, memory controller 51 transfers a read command and a read address (collectively indicated by the CAWD data) to a selected primary memory P. Where the read address corresponds to data stored in the selected primary memory P, read data is output from the selected primary memory P to a corresponding secondary memory S. Otherwise, where the address communicated from memory controller 51 corresponds to data stored in the secondary memory S, the CAWD data is transferred to the selected secondary memory S and then read data is output from the selected secondary memory S to memory controller 51.

In a similar example, to write data to any one of memory groups 53_1 through 53_n, memory controller 51 transfers a write command, write data, and a write address (collectively indicated in the CAWD data) to a selected primary memory P. Where the write address corresponds to the selected primary memory P, the write data is written to the write address. Otherwise, where the write address corresponds to a corresponding selected secondary memory S, the CAWD data is transferred to the secondary memory S and then written to the indicated write address.

Figure 6:
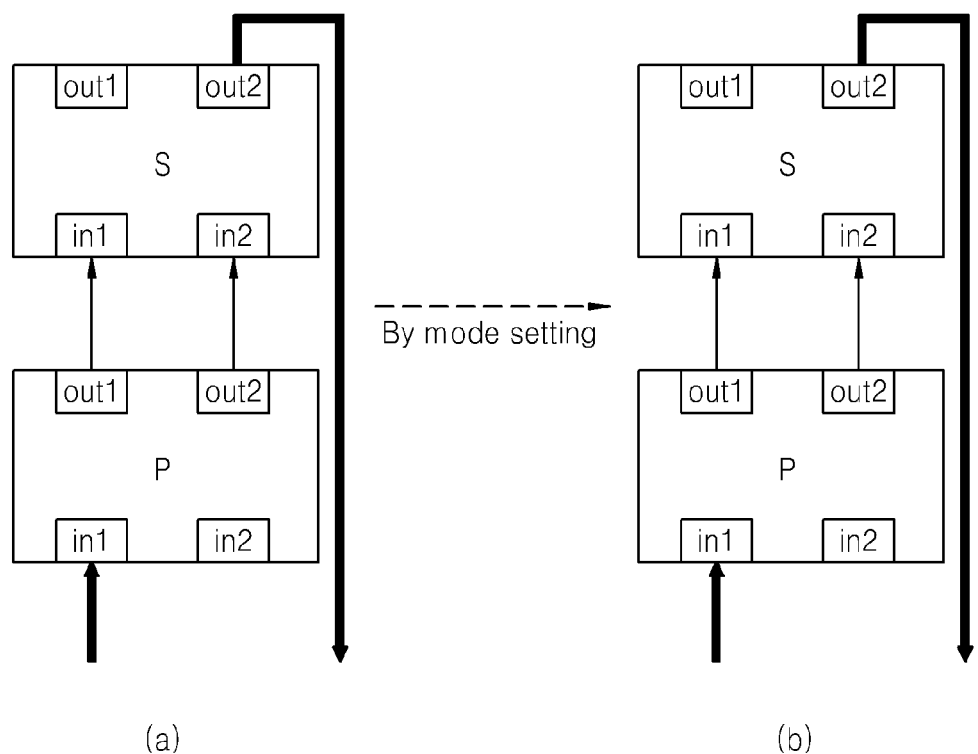
FIG. 6 is a block diagram illustrating a memory group from the memory system of FIG. 5.

FIG. 6 is a block diagram illustrating a single memory group within the memory system of FIG. 5. In the example illustrated in FIG. 6, memory group is assumed to comprise only two memory devices; a primary memory P and a secondary memory S.

As illustrated in FIG. 6, each one of the primary and secondary memory devices is implemented with first and second input ports ("in1" and "in2") and first and second output ports ("out1" and "out2"). Those of ordinary skill in the art will recognize that use of the term "port" in this context generally denotes the interface hardware and timing considerations required to transfer a constituent electrical signal to or from an integrated circuit device. Each first input port "in1" is configured to receive the "input data" such as CAWD associated with a read operation or a write operation. The read and write operations will be indicated by one or more commands communicated by the memory controller to a memory group.

Each second input port "in2" of at least the secondary memory S is configured to receive (or adapted to conditionally receive) "primary internal data" from the primary memory P. This primary internal data may take many different forms, but in certain embodiments of the invention will include read data stored in the primary memory and/or at least a portion of the input data communicated to the primary memory P from the memory controller. In the illustrated example, read data provided by primary memory P in response to a read command received from a memory controller is transferred from the primary memory P to the secondary memory S via the second input port "in2". Each first output port "out1" for at least the primary memory P is configured to transmit at least a portion of the input data (e.g., CAWD) received from the memory controller (or some other external source) to another memory device, such as a corresponding secondary memory S. Finally, each second output port "out2" is configured to provide output data to another device, such as a secondary memory or the memory controller.

In the illustrated example of FIG. 6, single-ended signaling is indicated by relatively thin arrows and differential signaling is indicated by relatively thick arrows. The type of signaling used at a particular input/output interface for each memory device may be specifically selected (or set) within the device. For example, as noted by the dotted arrow in FIG. 6, different types of signaling may be used to transmit data between various devices (primary memory to secondary memory, and secondary memory to memory controller). The type of signaling to be used may be set in one embodiment by storing information regarding the position of each memory in its memory group.

For example, the primary and secondary memories may be identical in their configuration and operation. Thus, the actual use of differential verses single-ended signaling at the input/output ports of each device becomes a product of its position in the memory group as a designated "primary" or "secondary" memory. Memory groups may have a number of different architectures including stacked, string, branch, etc. Nonetheless, the operational characteristics of each memory device may be uniquely or similarly defined according to its position in the memory module. In this context, the term "position" refers to the physical or logical position of a memory in relation to a data source, such as memory controller. Position may be assigned in view of a subordinated data relationship to data being passed through a memory group.

In the example illustrated in FIG. 6(a), differential signaling is used communicate CAWD to the first input port "in1" of the primary memory P. In response, at least a portion of the CAWD may be transferred to the first input port "in1" of the secondary memory device S using differential signaling. Additionally or alternately, read data stored in the primary memory and indicated by an address component of the CAWD is transferred from the second output port "out2" of the primary memory P to the second input port "in2" of the secondary memory S using differential signaling. Secondary internal data, such as read data from primary and/or secondary memory, is then transmitted from the second output port "out2" of the secondary memory S to the memory controller using differential signaling.

In contrast, due to a different "mode setting" internal to each of the primary and secondary memory devices, the example illustrated in FIG. 6(b) operates differently. For example, the stack position of each memory device within a stacked memory group may be used to define respective operating characteristics, including various data signaling schemes. Here, single-ended signaling is used to transfer at least a portion of the CAWD and/or read data (collectively or singularly termed "primary internal data") from the primary memory to the secondary memory using the same ports indicated above.

Those skilled in the art will appreciate that as the architecture of a memory group becomes more complex and involves more than two (2) memory devices, various system constraints and considerations, such as position may be used to define the operational status and signaling scheme to be used for each memory device and each input/output port for the respective memory devices. In this manner, read data, write data, and any combination of command and address data may be propagated through a group of related memory devices. In this regard, embodiments of the invention are not limited to the use of only a single memory controller.

Figure 7:
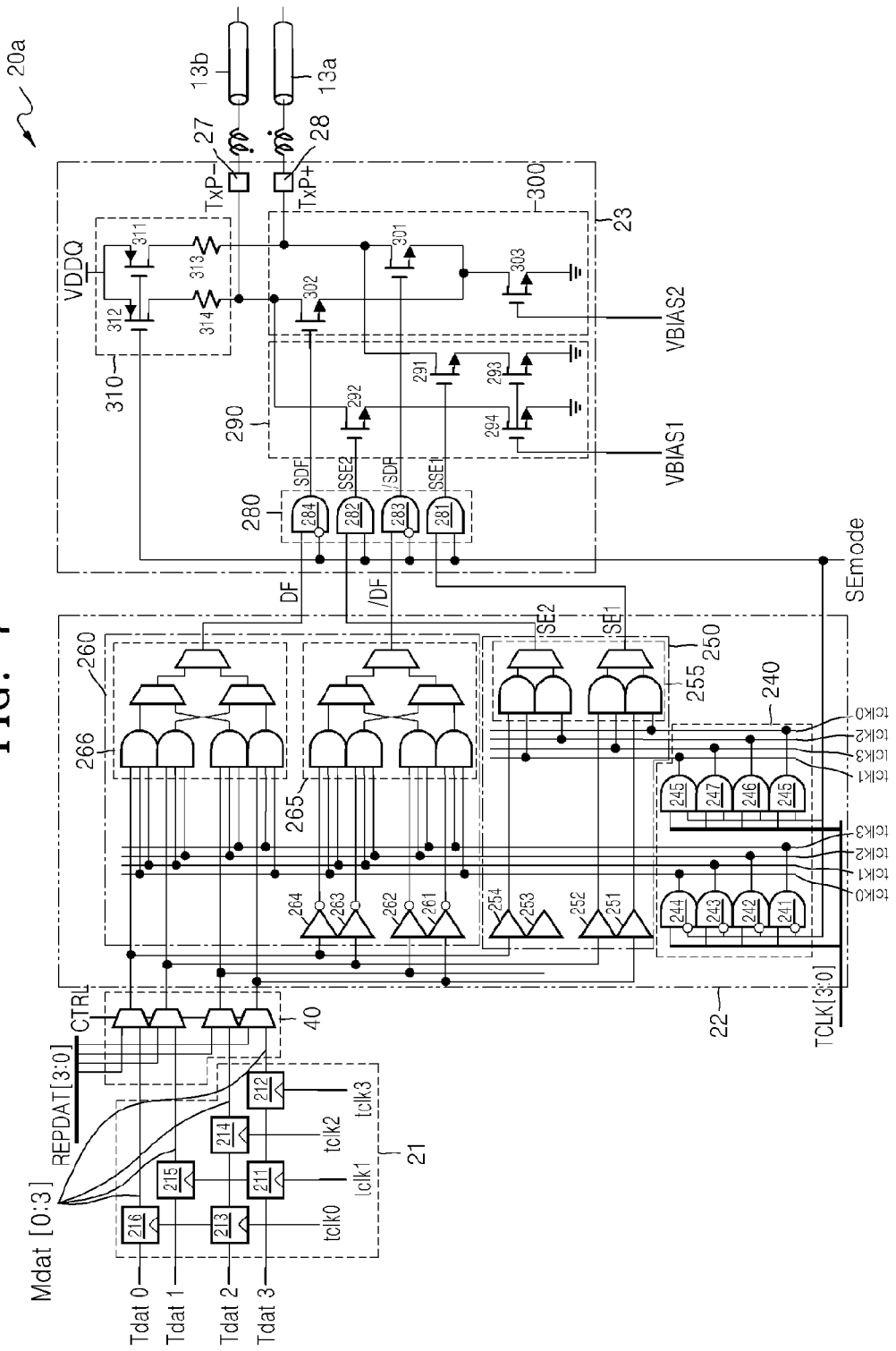
FIG. 7 is a circuit diagram illustrating a transmitting part within the first device of FIG. 2 in accordance with another embodiment of the invention.

FIG. 7 is a circuit diagram illustrating a transmitter 20a within first device 11 of FIG. 2 in accordance with another embodiment of the invention. Referring to FIG. 7, transmitter 20a is similar in configuration and operational nature to transmitter 20 previously described in relation to FIG. 3. However, transmitter 20a further comprises a selector circuit 40 interposed between data de-aligner 21 and D/SE signal generator 22 and used to implement a repeater function. The repeater function may be used, for example, to forward data from a particular input interface of one memory device to a particular output interface of another memory device within the context of the memory systems described in relation to FIGS. 5 and 6. For instance, a second input interface "in2" associated with a secondary memory S in FIG. 6 may be set to forward read data received from a corresponding primary memory P to memory controller 51.

In the illustrated example shown in FIG. 7, selector circuit 40 comprises a plurality of signal multiplexers, each receiving repeater data REPDAT[3:0] and respective serial data Mdat[0:3]. A control signal CTRL applied to each one of the signal multiplexers determines whether selector 40 transmits repeater data REPDAT[0:3] or serial data Mdat[0:3] to D/SE signal generator 22. The control signal CTRL may be generated, e.g., in relation to data stored in first device 11, such as data indicating the position of first device 11 within it constituent memory group (e.g., within a stack of memory devices). In this manner, data may be more flexibly transferred between memory devices, and certain data by-pass functions more readily implemented.

Remaining features and components of transmitter 20a have substantially the same structure and function as those previously described in relation to transmitter 20 illustrated in FIG. 3. Accordingly, a detailed further explanation of these features is omitted to avoid redundancy.

Figure 8:
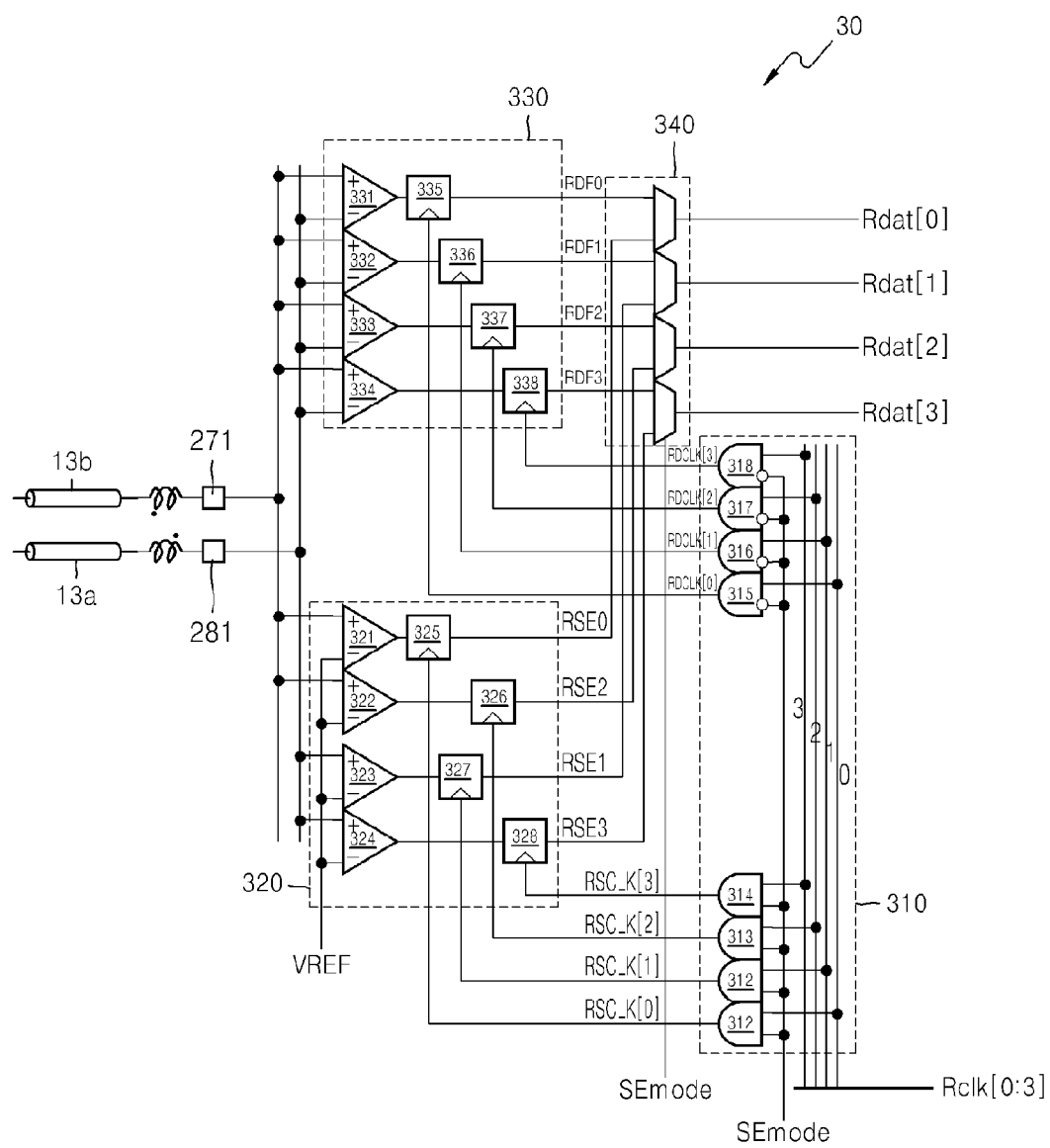
FIG. 8 is a circuit diagram illustrating an example of a receiving part in a second device of the communication system of FIG. 2 in accordance with an embodiment of the invention.

FIG. 8 is a circuit diagram further illustrating receiver 30 within communication system 10 of FIG. 1 in accordance with an embodiment of the invention. In the example illustrated in FIG. 8, receiver 30 is configured to receive data transmitted by transmitter 20 via channel 13 including in this particular embodiment data transmission lines 13a and 13b.

Referring to FIG. 8, receiver 30 comprises a control signal generator 310, a single-ended signal receiver 320, a differential signal receiver 330, and a selector 340. Receiver 30 receives signals transmitted via channel 13 via input pads 27' and 28' connected respectively to data transmission lines 13a and 13b.

Receiver 30 operates under the control of clock signals Rclk[0:3] and transmission mode signal SEmode. Like clock signals Tclk[0:3] in transmitter 20 of FIG. 3, clock signals Rclk[0:3] are assumed to be separated from each other by a phase difference of 90 degrees.

Control signal generator 310 receives clock signals Rclk[0:3] and transmission mode signal SEmode and outputs clock signals Rclk[0:3] as corresponding differential signaling clock signals RDCLK[0:3] or corresponding single-ended signaling clock signals RSECLK[0:3] based on the logic level of transmission mode signal SEmode. In particular, where transmission mode signal SEmode indicates the differential signaling mode, control signal generator 310 outputs clock signals Rclk[0:3] as differential signaling clock signals RDCLK[0:3] and where transmission mode signal SEmode indicates the single-ended signaling mode, control signal generator 310 outputs clock signals Rclk[0:3] as single-ended signaling clock signals RSECLK[0:3].

In the example of FIG. 8, control signal generator 310 comprises a plurality of "AND" logic gates 312 through 318 and associated inverters connected to respective lower inputs of logic gates 315 through 318 as indicated by empty circles.

Single-ended signal receiver 320 comprises a plurality of comparators 321 through 324 and a plurality of respectively corresponding flip-flops 325 through 328. Comparators 321 and 322 each receive a signal apparent on input pad 27' and a reference voltage VREF. Similarly, comparators 323 and 324 each receive a signal apparent on input pad 28' and reference voltage VREF. Each of comparators 321 through 324 produces an output signal with a logic level based on whether the corresponding signal apparent on input pad 27' or 28' is greater than reference voltage VREF.

Flip-flops 325 through 328 sample the respective output signals of comparators 321 through 324 in response to respective single-ended signaling clock signals RSECLK[0:3] to produce respective single-ended signals RSE0, RSE2, RSE1, and RSE3.

Differential signal receiver 330 comprises a plurality of comparators 331 through 334 and a plurality of respectively corresponding flip-flops 335 through 338. Comparators 331 through 334 each receive the respective signals apparent on data transmission lines 13a and 13b. Each of comparators 331 through 334 produces an output signal with a logic level based on whether the signal apparent on input pad 28' greater than the signal apparent on input pad 27'.

Flip-flops 335 through 338 sample the respective output signals of comparators 331 through 334 in response to respective single-ended signaling clock signals RDCLK[0:3] to produce respective differential signals RDF0, RDF1, RDF2, and RDF3.

Selector 340 comprises a plurality of multiplexers for selecting between differential signals RDF0 through RDF4 and single-ended signals RSE0 through RSE4 based on the logic level of transmission mode signal SEmode. Selector 340 selects and outputs either differential signals RDF0 through RDF4 or single-ended signals RSE0 through RSE4 based on whether transmission mode signal SEmode indicates the differential signaling mode or the single-ended signaling mode, respectively, and produces the selected and output data as received data Rdat[0:3].

Figure 9:
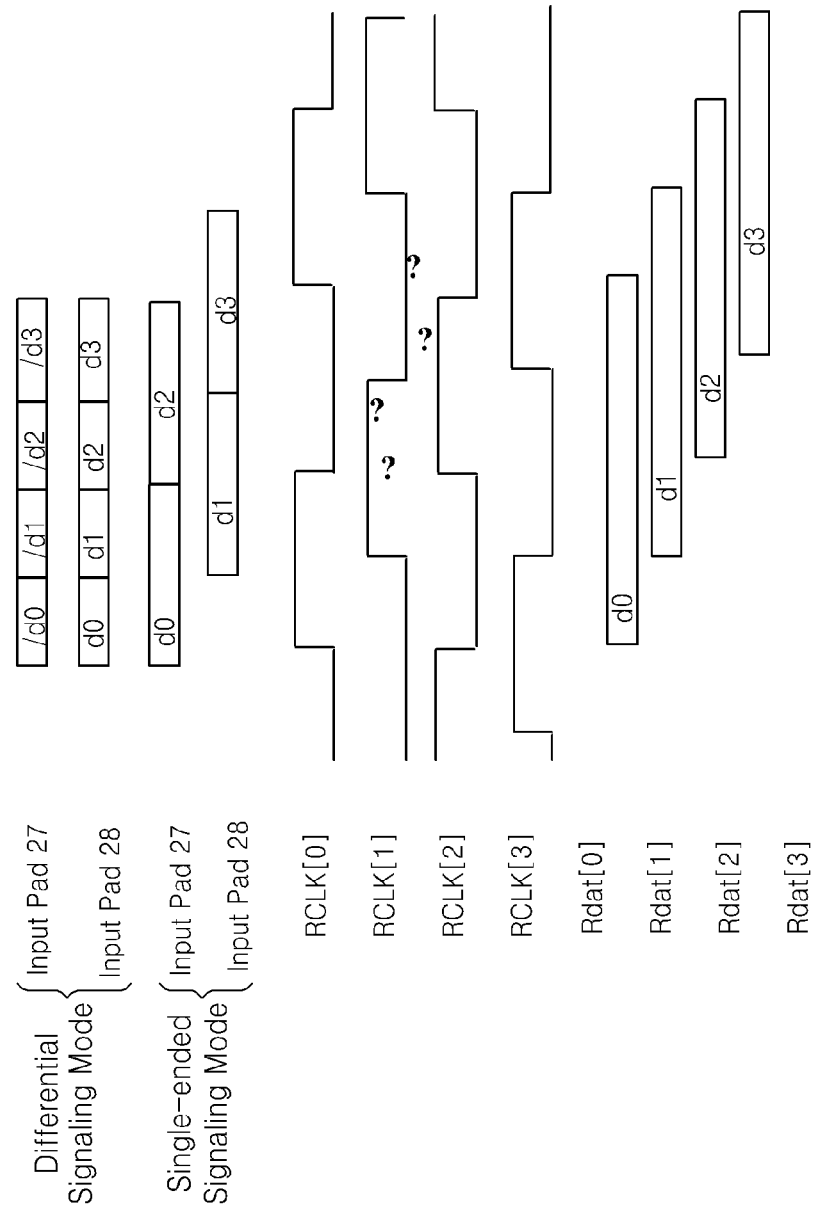
FIG. 9 is a waveform timing diagram illustrating the operation of the receiving part illustrated in FIG. 8.

FIG. 9 is a waveform timing diagram further illustrating the operation of receiver 30 shown in FIG. 8. In FIG. 9, data received from input pads 27' and 28' during a differential signaling mode are represented by a first pair of block signal illustrations at the top of FIG. 9 and data received from input pads 27' and 28' during a single-ended signaling mode are represented by a second pair of block signal illustrations below the first pair of block signal illustrations.

Referring collectively to FIGS. 8 and 9, the data received from input pads 27' and 28' during the differential signaling mode and during the single-ended signaling mode are sampled and output as received data Rdat[0:3] in synchronization with respective rising edges of clock signals RCLK[0:3].

Figure 10:
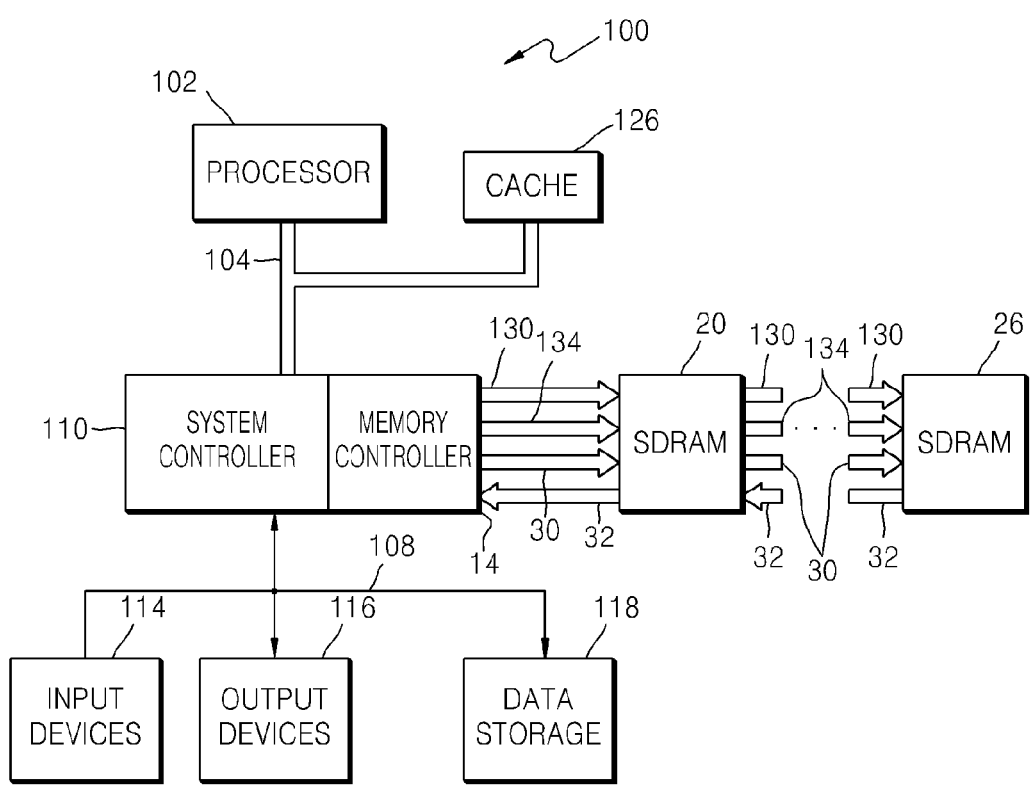
FIG. 10 is a general block diagram of a host device system susceptible to the benefits afforded by incorporation of one or more embodiments of the invention.

Any one of the foregoing embodiments may find application in many different types of host devices. FIG. 10 is a block diagram of a generic computer system in which one or more embodiments of the invention may find application. Computer system 100 is built around a logic platform conceptually divided into three (3) blocks; a central processor 102, a system controller 110, and an associated memory controller 14. System controller 110 and memory controller 14 may be implemented as separate integrated circuits or as a chip set. A memory cache 126 is conventionally associated with these three (3) primary computational logic blocks. The computational logic and control functionality separately ascribed to the processor 102, system controller 110 and memory control 14 might be readily aggregated into a single logic platform. However, specialization of hardware resources in contemporary computer systems is such that the overall functionality is better provided by separate, co-processing platforms.

System controller 110 generally directs data and control signal traffic, controlling access to Input devices 114 (e.g., mouse, keyboard, etc.), Output devices 116 (printer, telecom port(s), etc.), and one or more bulk data storage devices 118 (e.g., a CD drive, HDD, etc.). Access to these peripheral devices may be had through the operation of one or more expansion buses (e.g., a PCI bus, PCI express, Hyper-transport, Fire-wire, etc.).

System controller 110 may also be used to control access to a main Read/Write memory through associated memory controller 14. For purposes of this example, memory controller 14 of FIG. 10 may be implemented and operated in a manner similar to that described in relation to first device 11 of FIG. 1 (or memory controller 51 in FIG. 5) and a plurality of SRAM memory device 20-26 may be implemented and operated in a manner similar to that described in relation to second device 12 of FIG. 1 (or memory module 52 in FIG. 5). Various data buses 30, 32, 130, and 134 (incorporated within channel 13 of FIG. 1) connect memory controller 14 with the plurality of SRAM memory devices 20-26.

In view of the foregoing, those skilled in the art will be able to appreciate a variety of benefits provided by selected embodiments of the invention. For example, in selected embodiments of the invention, a single transmitter/receiver combination or transceiver supports both single-ended signaling and differential signaling without increasing the number of I/O pads (and corresponding I/O pins on a semiconductor package) required to transmit and receive signals using these different signaling techniques. In addition, in selected embodiments of the invention, single-ended signaling can be performed using a multi-phase clocking technique such that simultaneous switching noise is reduced.

The foregoing embodiments are disclosed as teaching examples. Those skilled in the art will recognize that various changes can be made to these examples without departing from the scope of the invention, which is defined by the claims that follow.

What is claimed:

1. A system, comprising: a memory controller; and at least one memory device connected to the memory controller; wherein the at least one memory device comprises:
a multi-phase clock generator configured to receive a system clock signal and to generate "n" (where n>3) internal clock signals in relation to the system clock signal, wherein each one of the "n" first internal clock signals has a different relative phase;
a receiver configured to receive and sample at least one signal communicating "m" data bits output by the memory controller using single-ended signaling or differential signaling, and respectively to generate single-ended signal data or differential signal data based on an operating mode of the receiver.

2. The system of claim 1, wherein the receiver comprises:

a single-ended signal receiver configured to receive and sample the at least one signal communicating the "m" data bits output by the memory controller using the single-ended signaling and to generate the single-ended signal data;

a differential signal receiver configured to receive and sample differential signals communicating the "m" data bits output by the memory controller using the differential signaling and to generate the differential signal data; and a selector configured to receive the differential signal data and the single-ended signal data and selectively to output the differential signal data or the single-ended signal data in response to a transmission mode signal of the receiver.

3. The system of claim 2, wherein the transmission mode signal is provided by a mode register in the at least one memory device.

4. The system of claim 3, wherein the mode register is implemented using fuse cutting or bonding.

\* \* \* \* \*